April 19, 1927.
J. BLACKBURN
1,625,188
PRESELECTING AND SHIFTING MECHANISM FOR SLIDING GEAR TRANSMISSIONS
Filed Dec. 15, 1924   3 Sheets-Sheet 1
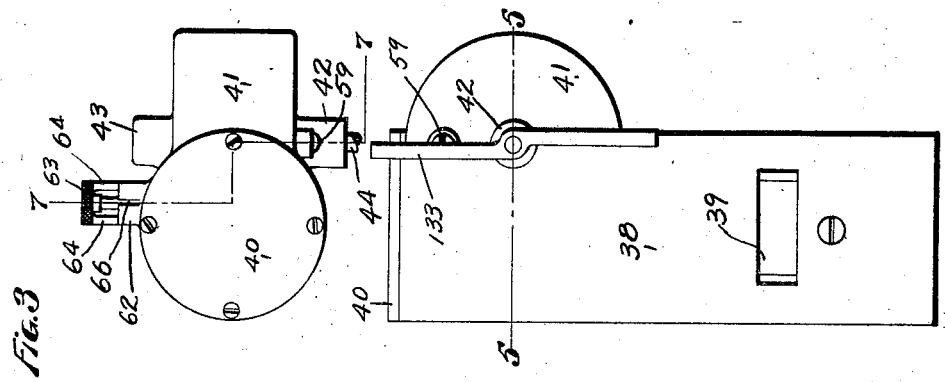
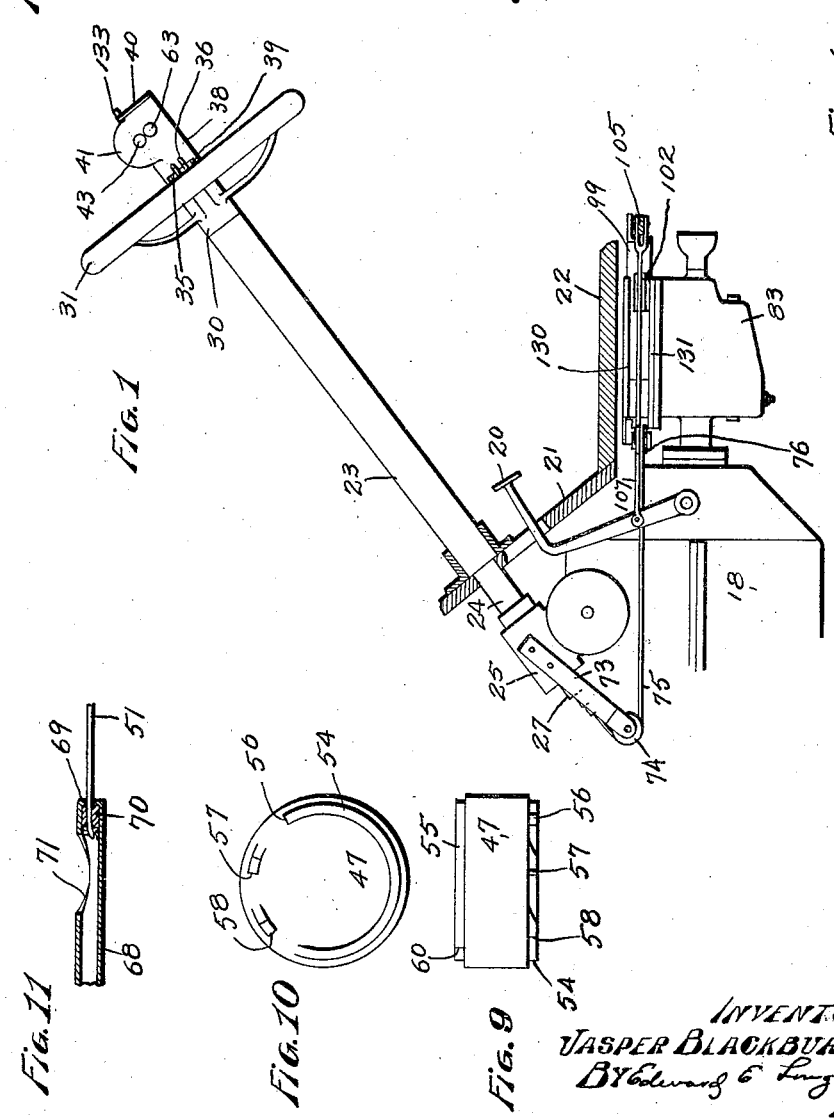
INVENTOR
JASPER BLACKBURN
BY Edward E. Longan
ATTY.

April 19, 1927.
J. BLACKBURN
1,625,188
PRESELECTING AND SHIFTING MECHANISM FOR SLIDING GEAR TRANSMISSIONS
Filed Dec. 15, 1924    3 Sheets-Sheet 2
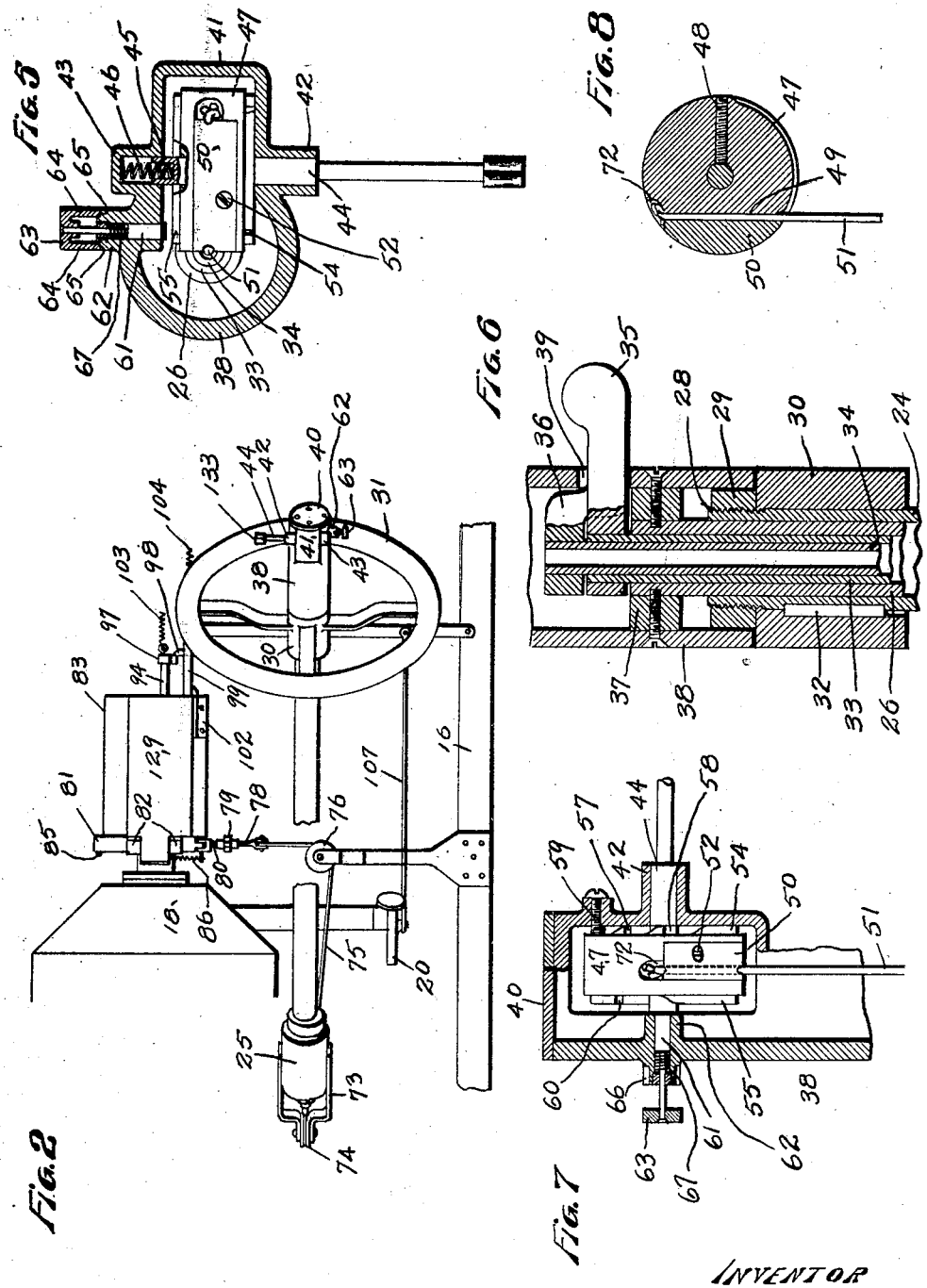
INVENTOR
JASPER BLACKBURN
BY
ATTY.

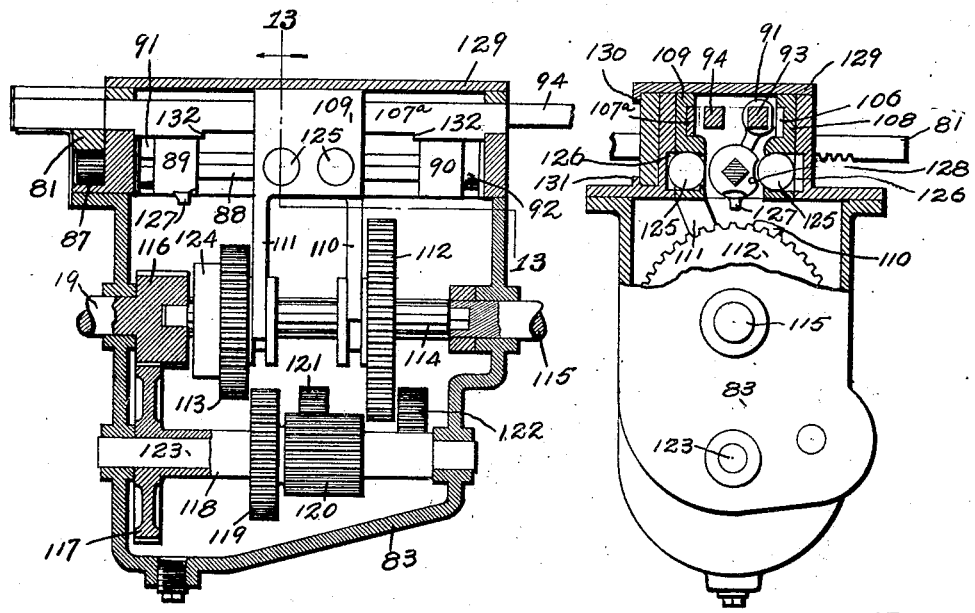
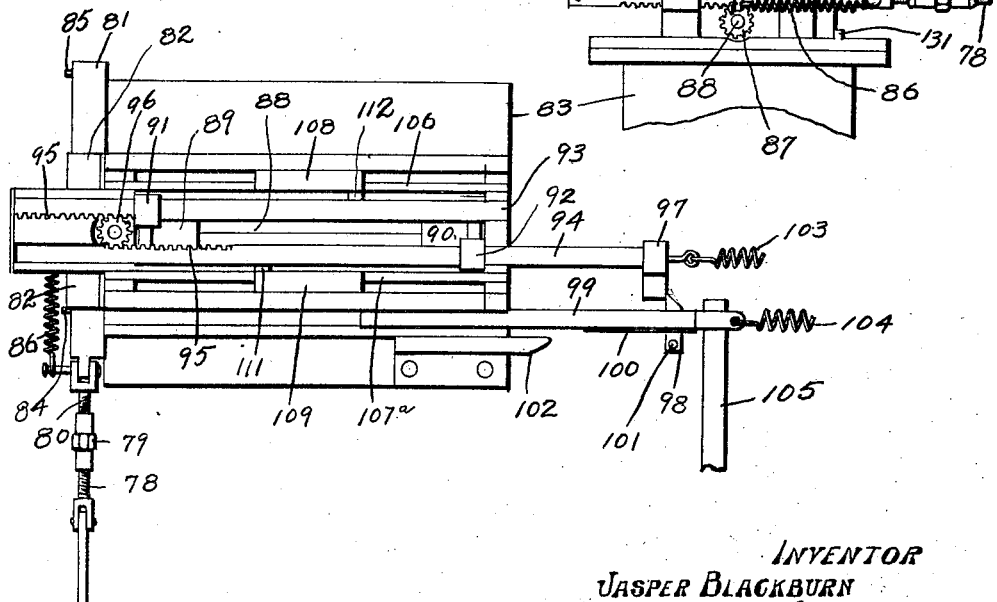

Patented Apr. 19, 1927.

1,625,188

UNITED STATES PATENT OFFICE.

JASPER BLACKBURN, OF WEBSTER GROVES, MISSOURI.

PRESELECTING AND SHIFTING MECHANISM FOR SLIDING-GEAR TRANSMISSIONS.

Application filed December 15, 1924. Serial No. 755,923.

My invention relates to improvements in preselecting and shifting mechanisms for sliding gear transmissions and has for its primary object a device operable from above the steering wheel of a motor vehicle whereby a predetermined speed may be preselected, said preselection being made independently of the shifting and at any time so that when a vehicle is traveling in high speed a preselection may be made for second or slow speed and the vehicle continue to travel in high until the operation of the shifting mechanism which will then shift the transmission into the preselected speed without any further adjustment by the operator.

A further object is to construct a preselecting and shifting mechanism for sliding gear transmissions in which the preselecting drums automatically return to their starting point as soon as the shift has been completed, and is then in position to be set for another preselection without the necessity of first starting the motor vehicle. In other words, with my device it is possible to have the transmission shifted into one speed and set to preselect a second speed without first starting the vehicle in the first selected speed. This is impossible with sliding gear transmissions which compose the standard shift in the present motor vehicle, it being necessary to first start the vehicle in one speed and after traveling a distance to shift into another speed, no preselection, however, being possible, the selection and shifting being accomplished by one continuous movement of the shift lever.

In the drawings:—

Fig. 1 is a fragmental side elevation of a motor vehicle showing the transmission, steering mechanism with my improved selector and shifter attached thereto;

Fig. 2 is a top plan view of the same;

Fig. 3 is an enlarged top plan view of the housing in which a part of the preselecting mechanism is contained;

Fig. 4 is a side elevation of the same;

Fig. 5 is a horizontal cross section taken on the line 5—5 of Fig. 4;

Fig. 6 is a vertical section of the lower part of the housing showing the manner of mounting the same and the position of the various controls;

Fig. 7 is a fragmental vertical cross section taken on the line 7—7 of Fig. 3;

Fig. 8 is a vertical cross section of the drum which forms part of the preselecting mechanism;

Fig. 9 is a top plan view of the same;

Fig. 10 is a side elevation of the same;

Fig. 11 is an enlarged fragmental section showing the manner of attaching the cable to the tube which extends through the steering column;

Fig. 12 is a longitudinal vertical section taken through the transmission housing showing the position of the various parts;

Fig. 13 is a fragmental section taken on the line 13—13 of Fig. 12;

Fig. 14 is a top plan view of the transmission with the cover removed; and

Fig. 15 is a fragmental elevation of the front part of the transmission showing the manner of operating the preselecting mechanism.

In the construction of my device I employ a chassis frame 16 in which is carried the usual engine 18, the crank shaft of which is connected to the transmission shaft 19 by means of the usual clutch, this clutch is not shown as its construction and operation is well known in the art and forms no part of my invention. The clutch is operated by means of the clutch pedal 20, 21 indicates the toe board and 22 the floor board of an automobile. Supported by the toe board is a tube 23 through which extends a tube 24. The lower end of this tube extends into a housing 25 in which is contained the mechanism for operating the steering rods, this mechanism may be of any desired construction and varies in detail in various makes of vehicles.

Located within the tube 24 is a second tube 26 which extends entirely through the tube 24 and has its lower end secured in a boss 27, which boss is formed integral with the housing 25. The tube 26 is so secured in this boss as to prevent its turning. The upper end of the tube 24 is screw threaded as at 28 so as to receive a nut 29, this nut is for the purpose of securing the hub 30 of the steering wheel 31 to the tube 24 and also prevents the wheel from lifting. The hub 30 is also secured to the tube 24 by means of a key 32 or other fastening means so that when the wheel is rotated the tube 24 will also have to turn. Located within the tube 26 are tubes 33 and 34 to which are attached operating levers 35 and 36, these levers being for the control of the spark and fuel, respectively.

Secured to the tube 26, adjacent its upper end, is a collar 37 which fits snugly within the lower end of the selector housing 38, the housing, however, extends sufficiently below the collar 37 so as to terminate in close proximity to the hub 30.

The housing 38 is provided with an opening 39 in its side which permits the passage of the levers 35 and 36. The housing is hollow and has its upper end closed by means of a cover 40, adjacent the upper end of the housing is provided a projecting semi-circular chamber 41 having flat sides, and projecting outwardly from the sides of this chamber are bosses 42 and 43. The boss 42 having an opening passing entirely therethrough, while the boss 43 is chambered so as to permit the shaft 44 to have bearing in both bosses. The shaft 44 is provided with a counter-bore 45 in which a spring 46 is located, the spring is adapted to contact with the closed portion of the boss 43 and have a tendency to force the pulley 47, which is carried by the shaft 44, toward the boss 42, the purpose of this will be explained in detail later. The pulley 47 is secured to the shaft by means of a screw or other fastening means 48. A portion of the pulley is cut away as at 49, which cut away portion is designed to be filled in with a segment 50. This cut away portion is for the purpose of securing one end of a cable or flexible member 51 to the drum. The segment being held in position by means of a screw 52. The periphery of the drum is also grooved as at 53 so as to form a guideway for the flexible member 51. On opposite sides of the pulley are formed projections 54 and 55 which are preferably in the form of rings and concentric with the axis of the pulley. The projection 54 has cut away portions so as to form teeth 56, 57 and 58 which have inclined rear faces and straight front faces. These projections are designed to come in contact with a stop 59 located on the same side of the housing as the boss 42. These teeth are designed to hold the pulley 47 in proper position for the various speeds, the tooth 58 being for low speed, the tooth 57 for intermediate or second, and the tooth 56 for high speed, there is no tooth for the reverse, as will be explained in detail later.

The projection 55 is cut away at one point only so as to form a tooth 60, this tooth is designed to stop the pulley at such a point that the transmission can be shifted to neutral, and in order to prevent the neutral position from operating continuously a spring actuated dog 61 is employed. This dog is mounted in a boss 62 and is provided with an operating knob 63, the knob 63 is provided with projections 64 which are designed to enter shallow recesses 65 formed in the projection 62 and hold the dog in withdrawn position. These projections and shallow recesses are for the purpose of preventing the knob from turning and cause the dog 61 to operate accidentally. The projection 62 is also provided with deep recesses 66 which permit the projections 64 to enter therein and allow the dog 61 to be forced inward by means of a spring 67 a sufficient distance to come in contact with the tooth 60. The neutral position is preferably arranged to be midway between intermediate and high speeds, although it may be so positioned as to come between first and intermediate, or between first and reverse, this being entirely optional. It may also, if desired, place a neutral stop between all of the various preselections, that is, between reverse and first, between first and second, and between second and third.

The flexible member or cable 51 is preferably of short length and has its free end attached to a tube 68. The end of the tube is bent over as at 69 leaving a passage of sufficient size to permit the flexible member 51 to pass therethrough. The end of the flexible member is secured in a plug 70 in any suitable manner, either by knotting the end of the member or by spreading it and soldering the same therein.

The tube 68 is provided with an opening 71 which permits the free end of the flexible member to be inserted therethrough, and also permits the passage of the plug 70. After the plug 70 is in position, the tube may be slightly flattened immediately to the rear of the plug so as to prevent its shifting, after this the free end of the flexible member 51 is placed between the pulley 47 and the segment 50, which segment is then secured to the pulley by means of the screw 52. The pulley 47 is also provided with a cut away portion 72 so as to form a recess in which the free end of the cable or flexible member 51 can be secured. This may be done either by separating the strands of the cable and filling the spaces between the strands with solder or by knotting the cable.

Secured to the housing 25 is a yoke 73 which carries a sheave or grooved wheel 74, around which a flexible member 75 passes. This flexible member has its one end secured in the tube 68 in any suitable manner. If desired, the flexible member 75 and tube 68 may be dispensed with and the member 51 continued down through the tube 34 and passed around the sheave 74. The flexible member 75 is then brought around a second sheave 76, preferably carried by the frame 16, and has its free end secured to a screw 78 on the end of which is secured a turnbuckle 79. To the opposite end of this turnbuckle is a second screw 80 which is pivotally attached to a rack 81, the rack 81 is slidably carried in brackets 82 which are attached to the front of the transmission housing 83. The rack is provided with stops 84 and 85 which are designed to limit its movement forward and backward, the backward movement of the rack being controlled by means of a coil spring 86. The rack 81 meshes with a gear 87 which is carried by a shaft 88 which is mounted longitudinally in the transmission housing 83. Slidably mounted on the shaft 88 are preselecting drums 89 and 90, these drums are slidably operated on the shaft by means of yokes 91 and 92 respectively, these yokes being in turn secured to shafts 93 and 94. The forward ends of the shafts 93 and 94 are provided with gear teeth 95 which mesh with a gear 96. This gear is so arranged as to cause the rods 93 and 94 to move in opposite directions simultaneously, thus simultaneously moving the preselecting and shifting drums 89 and 90 to and from each other.

The shaft 94 projects beyond the rear portion of the housing 83 and is provided on its end with a lug 97 which is designed to be contacted with by a dog or pawl 98 slidably carried in the bar 99, which bar in turn is slidably mounted on one side of the transmission housing. The dog 98 is held in operative position by means of a leaf spring 100 and is provided with a projecting pin 101 which is designed to contact with a withdrawing member 102 for the purpose of withdrawing the dog from contact with the lug 97 and permits the spring 103, which is attached to the shaft 94, to return the shaft to the position shown in Fig. 14. The spring 104 is adapted to return the slide 99 to the position shown in Fig. 14. The free ends of the springs 103 and 104 may be attached to any suitable point on the frame of the car.

Pivotally attached to the frame 16 is a lever 105, the free end of this lever is adapted to be brought in contact with the slide 99 for the purpose of operating the same and causing the shafts 93 and 94 to reciprocate and thus accomplishing the shift. The lever 105 is operated by means of a bar or rod 107 which is preferably attached to the clutch pedal so that the shifting will be accomplished simultaneously with the depression of the clutch pedal. The lever 105 is, however, so arranged that it will not contact with the slide 99 until the clutch has been disconnected. In other words, a certain amount of lost motion is provided for in the lever 105 to prevent any shifting taking place before the clutch has been disconnected.

Carried by the upper part of the housing 83 are bars 106 and 107ª on which are located slides 108 and 109, these slides are provided with forks 110 and 111 respectively, which in turn engage with recessed collars carried by the gears 112 and 113 respectively. These gears are slidably mounted on a splined shaft 114, which shaft is mounted in the housing 83. The splined shaft has attached thereto a shaft 115 which in turn is connected to the propellor shaft by the usual universal coupling.

Formed integral with the shaft 19 is a gear 116 which in turn meshes with a gear 117 formed integral with the sleeve 118, this sleeve has also formed thereon gears 119 and 120. The gear 119 being for the intermediate speed and the gear 120 for the low speed, this gear also meshes with a gear 121 which in turn rotates the gear 122 and constitutes the reverse drive. The gears 117, 119 and 120 are carried by a counter-shaft 123. The gear 113 has formed thereon a collar 124 which is provided with intermediate gear teeth and which is adapted to fit over the gear 116 and constitutes the high speed or direct drive.

In the slides 108 and 109 are formed openings in which balls 125 are placed, these balls are of larger diameter than the thickness of the slides and are adapted to enter recesses 126 formed in the side walls of the casing 83. The purpose of this is to permit the selecting and shifting sleeves 89 and 90 to pass these balls when the gears are in neutral position. In other words, the balls are permitted to enter the recesses 126 and thus allow the drums to pass by without imparting any movement to the slide. The drums 89 and 90 are each provided with a projection 127 and with a longitudinally extending recess 128, this recess is for the purpose of permitting the drums to pass by the balls 125 so that the slides may be operated.

The cover 129 is provided with a downturned portion 130 which acts as a guide for the upper part of the slide 99, while the rib 131 acts as a guide for the lower edge.

The bars 106 and 107ª are also provided with projections which form shoulders 132 and which limit the movement of the slides 108 and 109.

The operation of my device is as follows:—

We will assume the transmission to be in neutral position. After the engine has been started the handle 133 carried by the shaft 44 is turned forward or toward the front of the machine until it is impossible to turn it any farther. It is then allowed to gradually go back until it stops, which will be when the tooth 58 comes in contact with the pin or stop 59, the slow speed has now been selected. In other words, the rack 81 has been pulled sufficiently far to rotate the drum 90 so that the projection carried thereby will contact with the slide 108. The clutch lever is now depressed at first movement tending to loosen or disengage the clutch, immediately after the clutch is disengaged the lever 105 comes in contact with the end of the slide 99. A continued downward movement of the clutch lever carries the rod bar or slide 99 forward and with it the shaft 94, this shaft in turn imparting rotation to the gear 96 and causing the shaft 93 to move in the opposite direction and thus the forks 91 and 92 move the drums 89 and 90 toward each other.

The projection 90 on coming in contact with the slide or shifter fork 108 moves it forward so that the gear 112 will mesh with the gear 120. As soon as these gears have meshed the dog 98 is withdrawn, this permits the spring 103 to cause the shafts 93 and 94 to return to their original position thus restoring the selecting drums 89 and 90 to their original position at each end of the casing 23.

The machine is now ready to start ahead in low speed, but before doing so, the operator presses the handle 133 inward compressing the spring 46 and moving the pulley 47 laterally so as to disengage the tooth 58. The handle is now permitted to commence to come back and the inward pressure on the handle released, this causes the spring 46 to force the pulley over and permit the tooth 57 to engage with the stop 59. This gives a preselection for second speed and places the projection on the drum 89 in position to contact with the slide 109. The clutch pedal is now allowed to come up and reengage the clutch and the vehicle starts forward in low speed. Upon depressing the clutch pedal again the selecting drums 89 and 90 are moved toward each other, but before the projection on the drum 89 comes in contact with the slide 109, the end of the drum 89 comes in contact with one of the balls 125 carried by the slide or shifter fork 108. This ball being out of the recess 126 is in contact with the wall of the housing 83 and cannot move inward, consequently the movement of the drum 89 forces the shifter fork 109 back until it is in such position that the ball can drop into the recess 126, which will be when the gears 112 and 120 are out of mesh. A continued movement of the drums toward each other cause the projection 127 on the drum 129 to contact with the fork 109 causing it to shift the gear 113 into mesh with the gear 119. This movement, of course, forces out the balls 125 carried by the drum 109, but the recess or grooves 128 in the drum 90 is opposite these balls and consequently does not interfere with the movement of the shifter fork. As soon as this shifting is complete the handle may be again pressed inward and the pulley 47 permitted to rotate so that the tooth 56 can engage with the stop 59. A depression of the clutch lever will cause the projection on the drum 90 to contact with the shifter fork 109 and move it so that the collar 124 will slip over the gear 116 thus placing the machine in direct drive.

In order to reverse the machine the handle 133 is turned forward as far as it will go, this of course being limited by the stop 85 on the rack 81. The projection carried by the drum 89 is then in position to operate in connection with the shifter fork 108 which will throw the gear 112 into mesh with the gear 122. In this connection it is to be noted that there is no stop on the pulley 47 for the reverse gear but the handle 133 is held in its forward position until the shift has been completed and upon its release the mechanism will automatically make the selection for first speed so that upon disengagement of the clutch to stop the backward movement, first speed forward will be thrown in gear and upon reengaging the clutch the machine will travel forward instead of back, and I am of the opinion that this feature will save many a mashed fender and broken garage wall because it will be impossible for the driver to forget to shift to a forward speed when releasing the clutch after backing up and bringing the machine to a stop.

Should it be desired to shift into neutral the clutch pedal can be depressed either half way or else the knob 63 is so turned that the projections 64 can enter the recesses 66, the spring 67 forcing the dog inward. Then after the car is in that speed and it is desired to make the next shift to neutral or to set the transmission so that the next shift will be to neutral, it is only necessary to place the finger against the free end of the shaft 44 and press it inward. The spring 68 exerts a pull and causes the pulley 47 to rotate until the tooth 60 contacts with the dog 61, this places the drums 89 and 90 in such a position that neither the groove or recess 128 nor the tooth 127 are in position to contact with the shifter forks so that when the device is set in any speed the end of one of the selection drums will come in contact with the balls carried by the fork which is in shifted position and move it into neutral. While the drums are permitted to ride past the other shifter fork freely, due to the fact that the balls 125 can enter the recesses 126 and consequently no shifting of that fork will take place.

The cable or flexible member 51 is so arranged that the pulley 47 will not turn back any farther than high speed when the handle is pressed inward so that at no time can the tooth 51 be beyond the stop 59, so that there can be no confusion arising as to what speed has been preselected because the driver will know that after the second click the device is ready to be shifted to low, in fact, that that preselection has been made.

While I have shown my device as accomplishing the shifting through the depression of the clutch pedal, I do not desire to limit myself thereto, as I may employ other means to operate the slide 99 without departing from the spirit of my invention. Instead of using a cable for the flexible member 51 a chain or a wire may be used, and as previously stated, a continuous flexible member may be employed instead of the tube 68.

The turn-buckle 79 is for the purpose of adjusting slack, should any occur through the stretching of the flexible member so that preselection can be always properly made. In this connection it might be necessary to place a mark on the rack 81 which will indicate either low or intermediate speed in making this adjustment, because a full release will naturally preselect for high speed at a full pull in the opposite direction preselected for reverse. These preselections being controlled by the pins 84 and the rotation of said shaft step by step in the opposite direction, a flexible member having one end secured to said shaft projecting from one end of the housing, a sliding member secured to the free end of said flexible member and adapted to be longitudinally moved in one direction by the rotation of said shaft, means for longitudinally moving said shaft for disengaging the same from the step by step rotating means, and means tending normally to move the sliding member in the opposite direction.

3. A device of the class described comprising a housing, a shaft carried by said housing and projecting from one side thereof, a pulley mounted on said shaft within the housing, a flexible member having one end secured to said pulley projecting from one end of said housing, means for winding a predetermined amount of flexible member on said pulley, means for automatically on said pulley, a sliding member attached to the opposite end of said flexible member and adapted for operation during the winding and unwinding of the flexible member, means attached to said sliding member and tending normally to unwind said flexible member, and a stop located within said housing and adapted for contact with said pulley for limiting the amount of flexible member unwound therefrom.

In testimony whereof, I have signed my name to this specification.

JASPER BLACKBURN.